United States Patent
Kirigin

(10) Patent No.: US 9,626,340 B2
(45) Date of Patent: Apr. 18, 2017

(54) BOOKMARKING SHARED FILE AND FOLDER LINKS

(71) Applicant: Dropbox, Inc., San Francisco, CA (US)

(72) Inventor: Ivan Kirigin, San Francisco, CA (US)

(73) Assignee: Dropbox, Inc., San Francisco, CA (US)

(*) Notice: Subject to any disclaimer, the term of this patent is extended or adjusted under 35 U.S.C. 154(b) by 501 days.

(21) Appl. No.: 13/725,554

(22) Filed: Dec. 21, 2012

(65) Prior Publication Data

US 2014/0068401 A1    Mar. 6, 2014

Related U.S. Application Data

(60) Provisional application No. 61/693,962, filed on Aug. 28, 2012.

(51) Int. Cl.
| | | |
|---|---|---|
| *G06F 17/00* | (2006.01) | |
| *G06F 17/22* | (2006.01) | |
| *G06F 17/30* | (2006.01) | |

(52) U.S. Cl.
CPC .... *G06F 17/2235* (2013.01); *G06F 17/30867* (2013.01); *G06F 17/30884* (2013.01)

(58) Field of Classification Search
CPC .................. G06F 17/30867; G06F 17/30884
USPC ........................................ 715/200, 205, 206
See application file for complete search history.

(56) References Cited

U.S. PATENT DOCUMENTS

| | | | | |
|---|---|---|---|---|
| 6,675,205 B2* | 1/2004 | Meadway | ......... | G06F 17/30206 707/999.01 |
| 7,080,139 B1* | 7/2006 | Briggs | ................... | G06Q 30/02 707/999.003 |
| 7,260,646 B1* | 8/2007 | Stefanik et al. | .............. | 709/238 |
| 7,685,204 B2* | 3/2010 | Rogers | .............. | G06F 17/30766 707/758 |
| 8,396,800 B1* | 3/2013 | Wieder | ................. | H04L 67/306 705/50 |
| 8,756,656 B1* | 6/2014 | Hartmann | ........................ | 726/3 |
| 9,318,152 B2* | 4/2016 | Kretz | ...................... | G11B 27/11 |
| 2001/0056463 A1* | 12/2001 | Grady et al. | .................. | 709/203 |
| 2003/0120729 A1 | 6/2003 | Kim et al. | | |
| 2006/0230030 A1 | 10/2006 | Volpa et al. | | |
| 2007/0118514 A1* | 5/2007 | Mariappan | ....................... | 707/3 |
| 2007/0203917 A1 | 8/2007 | Du et al. | | |
| 2007/0233647 A1* | 10/2007 | Rawat et al. | ...................... | 707/3 |
| 2007/0279379 A1* | 12/2007 | Stefanik et al. | .............. | 345/156 |

(Continued)

OTHER PUBLICATIONS

Houston, Andrew et al., "File Sharing Via Link Generation", PCT International Search Report and Written Opinion, PCT Application No. PCT/US2011/041531, Apr. 6, 2012, 8 pages.

*Primary Examiner* — Stephen Hong
*Assistant Examiner* — Gregory J Vaughn
(74) *Attorney, Agent, or Firm* — Polsinelli PC

(57) ABSTRACT

A document management system that is adapted to allow users to share files or folders by: (1) creating a link to the files or folders; and (2) sharing the link with other users. In particular embodiments, the system is adapted to keep track of any links generated by, sent by, and/or received by a particular user. The system may display a listing of the links upon request by a user, so that the user may re-use or deactivate the links, or modify attributes of the links. Having a centralized listing of the links may be particularly advantageous in helping a user keep track of the files and folders that they have shared and received.

19 Claims, 11 Drawing Sheets

(56) References Cited

U.S. PATENT DOCUMENTS

| | | |
|---|---|---|
| 2008/0216139 A1 | 9/2008 | Liwerant et al. |
| 2009/0287715 A1 | 11/2009 | Chi et al. |
| 2010/0211998 A1 | 8/2010 | Soelberg et al. |
| 2011/0035503 A1* | 2/2011 | Zaid et al. .................... 709/228 |
| 2011/0137986 A1 | 6/2011 | Wolf |
| 2011/0264532 A1 | 10/2011 | Chan et al. |
| 2012/0278404 A1 | 11/2012 | Meisels et al. |
| 2013/0018960 A1* | 1/2013 | Knysz et al. ................ 709/204 |

* cited by examiner

BOOKMARKING SHARED FILE AND FOLDER LINKS

CLAIM OF PRIORITY

This application claims the benefit of priority under 35 U.S.C. §119(e) to the filing date of U.S. Provisional Patent Application No. 61/693,962, filed Aug. 28, 2012, entitled, "Bookmarking Shared File And Folder Links," which is incorporated herein by reference in its entirety.

BACKGROUND

Individuals often wish to share digital files with others. This is often done by simply e-mailing copies of the files to others, by providing copies of the files on a physical medium such a flash drive, or by sending hyperlinks ("links") to files stored on a network-accessible file storage system by centralized document management services such as DROPBOX or NETDOCUMENTS. Although sharing documents via file-sharing links is convenient, it is often difficult for users to keep track of the links. Accordingly, there is a need for improved systems and methods for tracking file-sharing links.

SUMMARY OF THE INVENTION

A computer-implemented method of managing file sharing links, in various embodiment, comprises: (1) in response to receiving a request to share a file set, generating a file set sharing link, wherein the file set sharing link is configured to provide a link recipient with at least access to a linked file set; (2) capturing information associated with the generated file set sharing link; (3) capturing information associated with the link recipient; (4) associating the link recipient information with the captured information associated with the file set sharing link; and (5) in response to a request to view the information associated with the generated file set sharing link, displaying a list of file set sharing links associated with the requester, wherein the list of file set sharing links contains information about the generated file set sharing link.

A computer system, in accordance with various embodiments, comprises one or more processors, and memory. The one or more processors is adapted to, within the context of a synched file management system: (1) store information regarding a plurality of file sharing links associated with a user, wherein the file sharing links provide access to files that are stored in the memory; and (2) selectively display a listing of the one or more file sharing links to the user.

BRIEF DESCRIPTION OF THE DRAWINGS

Various embodiments of a computer system for providing viewing rights to files and folders through shared file set links and the organization of these file set links are described below. In the course of this description, reference will be made to the accompanying drawings, which are not necessarily drawn to scale, and wherein.

DETAILED DESCRIPTION

Various embodiments will now be described. It should be understood that the present system and method may be embodied in many different forms and should not be construed as limited to the embodiments set forth herein. Rather, these embodiments are provided so that this disclosure will be thorough and complete, and will fully convey the scope of the present system and method to those skilled in the art. Like numbers refer to like elements throughout.

System Overview

A document management system, according to various embodiments, is adapted to allow users to share files or folders stored on a networked file storage device by: (1) creating a link to the location of the files or folders in the storage device; and (2) sharing the link with other users by sending to such other users a communication containing the created link. The other users may access the files or folders by "clicking" or selecting the link, or by copying the link from the communication of the sending user and pasting it into a browser on their computer.

In particular embodiments, the system is adapted to keep track of any links generated by, sent by, and/or received by a particular user. The system may display a listing of the links upon request by a user, so that the user may re-use or deactivate the links, or modify attributes of the links. Having a centralized listing of the links may be particularly advantageous in helping a user keep track of the files and folders that they have shared and received.

In certain embodiments, the links may be links to read-only copies of files stored centrally by a document management service, such as the DROPBOX service offered by Dropbox, Inc. of San Francisco, Calif. However, in other embodiments, the links may be links to shared folders, i.e.

folders containing files that may be modified by multiple users remotely located from one another.

Exemplary System Platform

Figure 1:
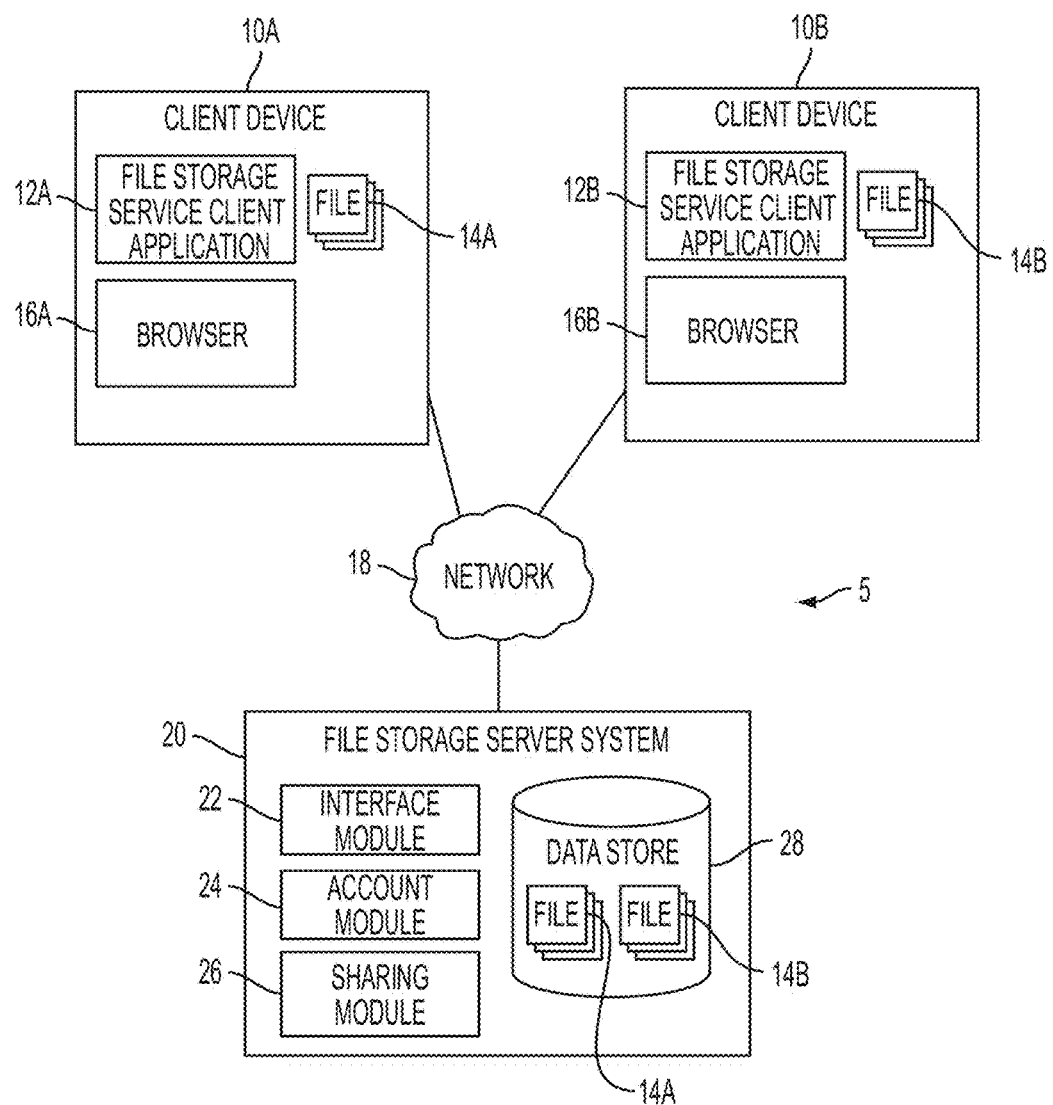
FIG. 1 is a block diagram of a file management system in accordance with an embodiment of the present system.

An exemplary platform for implementing various embodiments will now be discussed. Referring to FIG. 1, a system 5 implementing file set sharing and link management is shown having a plurality of client devices 10A and 10B (collectively 10) and a file storage server system 20, which are all interconnected by at least one network 18. Various aspects of client devices and file storage server systems are discussed below.

Client Devices

In various embodiments, each client device 10 has a file storage service client application 12A and 12B (collectively 12) through which respective files 14A and 14B of that client are specified for storage in file storage server system 20. It is noted that in some embodiments synchronized copies of files 14A and 14B may be kept on both file storage server system 20 and each respective client device 10. In some embodiments, client devices 10 may provide a file-browser type interface (not shown) for directly manipulating the files stored on file storage server system 20 without maintaining a local copy, such as on a smartphone or tablet computer. Client devices 10 may also include a web browser 16A and 16B (collectively 16) for retrieving and presenting web pages and other content from web servers. Examples of suitable web browsers that may be used by client devices 10 include FIREFOX, GOOGLE CHROME, INTERNET EXPLORER, OPERA, and SAFARI. It should be understood by those skilled in the art that web browser 16 may optionally be used to access file storage server system 20 instead of using file storage service client application 12.

Still referring to FIG. 1, while only two client devices 10A and 10B are shown for purposes of clarity, it should be understood by those skilled in the art that many client devices may simultaneously connect through network 18 to file storage server system 20 at any given time. Examples of client devices 10 include, but are not limited to a desktop computer, a laptop computer, a tablet-computing device and a handheld computing device such as a personal digital assistant, a tablet computer or a smart phone (e.g., an IPHONE or BLACKBERRY, or a SYMBIAN or ANDROID-based smart phone). Each client device 10 may store one or more files on file storage server system 20, and the files may be stored in any file format. When file storage service client application 12 presents files to a user, the files may be arranged in folders and the folders themselves may be arranged in other folders, or in any other arbitrary arrangement supported by file storage server system 20, as determined by the user. However, one of skill in the art should understand in light of this disclosure that each user's file storage architecture may be considerably different from the next, and in some instances, the file storage architecture may be implemented to maximize storage and file retrieval efficiency.

File Storage Server System

File storage server system 20 stores files and manages access to those files using client devices 10. File storage server system 20 and its components may be implemented using any appropriate hardware and software for performing file serving, storage and retrieval functions. For purposes of clarity and ease of description, FIG. 1 illustrates an exemplary file storage server 20.

File Storage Server System—Interface Module

In various embodiments, file storage server system 20 includes an interface module 22, an account module 24, a link-based sharing module 26 and a data store 28. Interface module 22 facilitates file access and file storage between file storage server system 20 and client devices 10. Interface module 22 receives files from and sends files to client devices 10 consistent with the user's preferences for sharing files. Interface module 22 may act as the counterpart to a client-side file storage service client application 12A, 12B user interface that allows a user to manipulate files directly stored on file storage server system 20. In some embodiments, software operating on client devices 10 integrates network-stored files with the client's local file system to enable a user to manipulate network-stored files through the same user interface (UI) used to manipulate files on the local file system, e.g., via a file explorer, file finder or browser application. As an alternative or supplement to the client-side file-explorer interface, user interface module 22 may provide a web interface for client devices 10 to access (e.g. via browser 16) and allow a user to manipulate files stored on file storage server system 20. In this way, the user can directly manipulate files stored on file storage server system 20.

File Storage Server System—Data Store

In various embodiments, data store 28 stores files such as those uploaded using client devices 10. In the embodiment illustrated in FIG. 1, a first user associated with client 10A (e.g. a link sharer) has certain files 14A associated with their account, and a second user associated with client 10B (e.g. a link recipient) has certain files 14B associated with their account. Copies of these files are stored in data store 28. Copies of each respective user's files may also be locally stored on multiple client devices 10 associated with that user.

Data store 28 maintains, for each user, information identifying the user, information describing the user's file directory in the data store, as well as other identifying information, in a file journal that is maintained for each user. In some embodiments, the file journal is maintained on file storage server system 20. This file journal may be updated periodically using information obtained directly from the file storage server system 20 and/or from information obtained from one or more client devices 10. In this way, the server-stored file journal on file storage server system 20 (hereinafter the "server-side file journal") is updated when a file is changed at the server or on the local client. The file storage server system 20 then communicates with one or more client devices 10 to assure that any relevant changes are reflected locally. For example, if a particular user makes a change to a particular file on a first client device, the change will be reflected in the server-side file journal, and the server-side file journal will be used to propagate the changes so that they are reflected both on the file storage server system 20 and on all client devices associated with that user as well as on client devices of users having shared access to the file. Such techniques may be implemented, for example, within the context of a synchronized file system such as the DROPBOX service of Dropbox, Inc. of San Francisco, Calif.

File Storage Server System—Account Module

Account module 24 tracks files stored in data store 28 and entries in the server-side file journal for each file. As users grant other users modification rights, account module 24 updates the server-side file journal associated with each user in data store 20. Account module 24 may also track client devices 10 that are associated with each user's account. Such devices may include, for example, a user's desktop computer, tablet computer, and handheld device.

File Storage Configuration

Figure 2A:
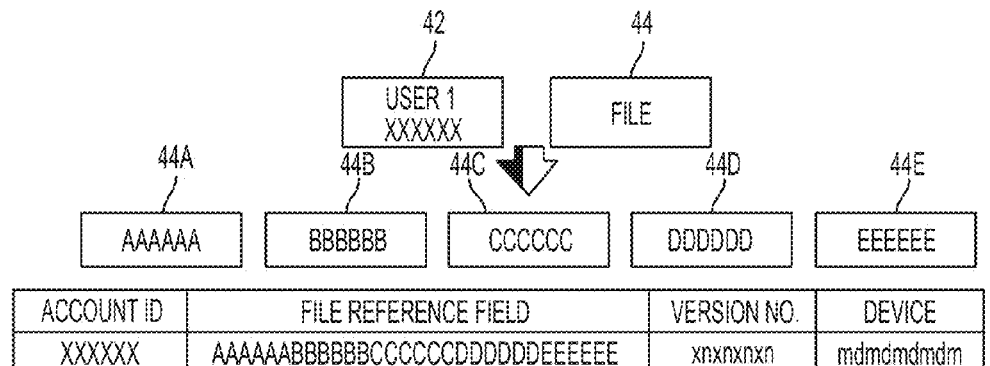
FIGS. 2A-2B are schematic representations of one embodiment of how files are segmented and stored in the file management system of FIG. 1.

Referring to FIG. 2A, to expedite file handling and updating, in one embodiment, files stored in data store 28 are segmented. That is, when user 42 uploads the file to data store 28, file storage server system 20 is configured to segment the file into file segments 44A-44E and to assign a unique identifier to each file segment. In one embodiment, the file segments may be four (4) megabytes in size, but it should be understood by those skilled in the art in light of this discussion that the size of the file segments can be of any suitable size. In one embodiment, first file segment 44A is assigned a unique identifier AAAAAA, file segment 44B is assigned identifier BBBBBB, and so forth. In one embodiment, the unique identifier is a hash value calculated for each file segment using one or more hashing methods. In some embodiments, the file segments are stored in memory and may be retrieved using the hash value for the file segment. To retrieve the file, the system may be adapted to use the respective unique identifiers for the various file segments to retrieve each file segment and then reconstruct the file for use by the user.

In various embodiments, file storage server system 20 is also configured to create a unique file reference string 46 for each file by concatenating file segment identifiers 44A-44E. User identifier XXXXXX and file reference string 46 are placed in a file journal entry 48. It should be understood that other information such as a version reference 50 and device reference 52 may also be included in file journal entry 48. In still other embodiments, information (metadata) related to the file and its content (e.g., image orientation, pixel resolution and file type if the file is an image) may also be included in the file journal entry to properly orient and process the file for ease of viewing. Those skilled in the art will understand from this disclosure that any information associated with a file might be included in file journal entry 48 to enhance the features of the present system. In yet other embodiments, file journal entry 48 may be entered into a single server-side file journal that is used for all users. In yet other embodiments, the system may assign each user their own server-side file journal so that only file journal entries for each file associated with that user are stored in their respective server-side file journal.

Figure 2B:
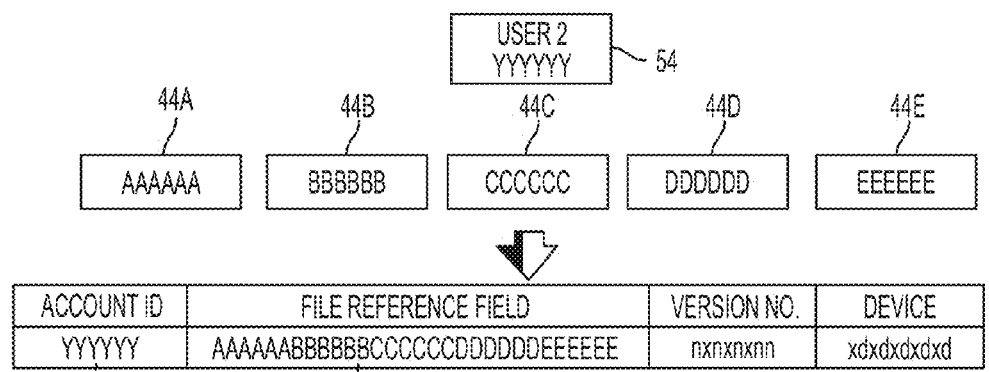

Referring to FIG. 2B, when file 44 is shared with another user 54 having a unique user ID YYYYYY, in one embodiment, file storage system 20 is configured to create another file journal entry 56 that associates file reference string 46 with the unique user identifier YYYYYY for user 54. Thus, when another user 54 is granted access to a file, it is unnecessary to store additional copies of the file in data store 28. Instead, when the other user clicks the file link, file journal entry 56 is used to reconstruct the file. That is, file storage server system 20 breaks the concatenated file journal entry 56 into its constituent parts and uses the unique segment identifiers to retrieve the various file segments that constitute the file. File storage server system 20 reconstructs the file from the various file segments and displays the file to the requesting user. It should be understood based on this disclosure to those skilled in the art that other efficient methods of file storage and user association may be used within the context of the present system and are within the scope of the disclosed system.

File Storage Server System—Sharing Module

In various embodiments, the link sharer can select any, or any combination of, a single file, multiple files within a folder, a folder, multiple folders, or multiple files across multiple folders (individually and collectively a file set) to be shared with one or more other users. It should be understood that when multiple files across multiple folders are shared as a file set, that file set defines a virtual folder for those files.

Figure 3:
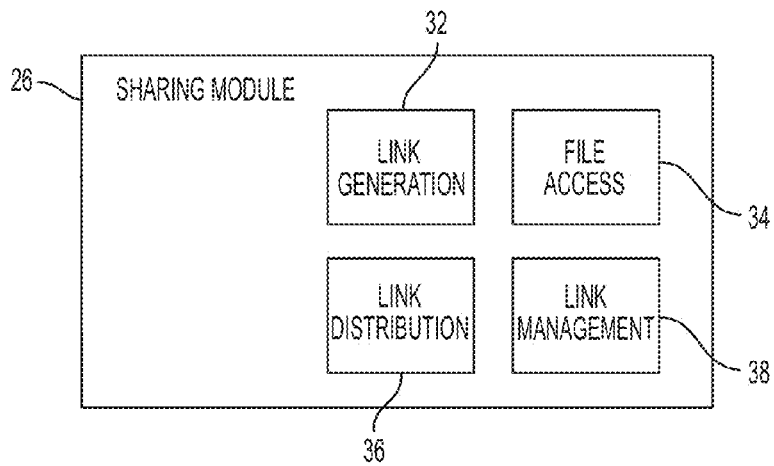
FIG. 3 is a block diagram of a sharing module for use in the file management system of FIG. 1.

Referring to FIG. 3, a block diagram illustrating the components of a link-based sharing module 26 in accordance with embodiments of the present system is shown. Link-based sharing module 26 enables a user to provide others access to his or her file sets through a shared link. Link-based sharing module 26 comprises a link generation module 32 for generating links to the shared file sets, a file access module 34 for accessing the files via the generated links, a link distribution module 36 for facilitating distribution of links to other users, a link management module 38 for viewing generated links and terminating links, and database 40 that maintains information about linked file sets and related information.

Link Generation Module

Link generation module 32 is configured to generate a link corresponding to the file set specified by the user. In one embodiment, upon receiving a request to share a particular file set, link generation module 32 generates the unique file set descriptor of the shared file set and a unique file location path or URL that serves as the link. Sharing module 26 saves an association of the file set descriptor and the file location path or URL to data store 28. In some embodiments, the generated file sharing link is independent of the file set descriptor so that the file set descriptor cannot be inferred from the file sharing link, and vice versa. An independent file set descriptor and file location path or URL prevents malfeasance by making it essentially impossible to guess or reverse engineer a sharable link. As an example, when sharing a folder "Reunion" with a file ID of 3D8B99, link generation module 32 might generate a unique (e.g., one-way pad, or a pseudo-random value) URL https://www.service.com/s/2608u2mnco/BBQ.pdf, where the URL component 2608u2mnco cannot be reverse-engineered, and accordingly create an entry <3D8B99, https://www.service.com/s/2608u2mnco/BBQ.pdf> in sharing database 40.

In still other embodiments, a user can generate multiple different links to the same folder. Thus, the user can more selectively control access to the folder by distributing different selections from among the multiple different links to different link-recipients or sets thereof. This may, for example, allow a user to deactivate certain links while keeping other links active.

In various embodiments, the generated file set sharing link can be used to provide many users access to a file set. For example, the link may be posted to a website such LinkedIn. In these embodiments, the link sharer may create a link to a file set that is relevant to a particular group of users on LinkedIn. By posting the link on the LinkedIn page, members of the group can use the link to view the contents of the folder.

Link Management Module

In various embodiments, the link management module 38 is configured to manage shared file links for both link sharers and link recipients. In some embodiments, when the link sharer generates a file set sharing link, link management module 38 stores the link and other associated information in a data store. Thus, for example, the file storage server system may track: (1) the generated link; (2) who activates the link; (3) the name of the files and folders associated with the link; (4) the date the link was created; (5) the dates the link was activated; and (6) various other information associated with the link.

Automatic Capture of Link Information

In embodiments where the link sharer uses a server-side mail client to send the file sharing link to a link recipient, the system may automatically capture link information. That is, the file storage server system 20 may be configured to automatically capture link information when the link sharer generates the link. Moreover, if the link sharer uses a server side e-mail client to share the link with a link recipient, the file storage server system 20 may also receive recipient-based information from the server side e-mail client at the time the link is sent to the link recipient. For example, the link sharer's contact information may be integrated into the file storage server system so the system can obtain and track link recipient information.

When a link sharer sends a link using an external e-mail system (e.g., gmail, Outlook, etc.) or by posting the link on a webpage (e.g., Facebook or Twitter), the file server storage system 20 may not be able to directly capture the link recipient information. Thus, to accommodate for links shared using communications outside the file storage server system 20, a software application or plug-in may run on the link sharer's client device and operate to detect when a link is being sent by a client side e-mail program or posted to a website.

For example, the application or e-mail plug-in may scan all sent e-mails for file sharing links. If such a link is detected, the application or e-mail plug-in can detect the recipient's e-mail address to whom the link was sent, and send this information back to the file storage server system 20. The file storage server system 20 can either store the detected recipient's e-mail address together with other information that was captured when the link was generated or, in various other embodiments where the link sharer's contact information is integrated with the file storage server system, the recipient's name can be determined from the captured e-mail address. In still other embodiments, the application or plug-in may also use optical character recognition techniques when it scans information in e-mails or websites that may be in non text-recognizable form, such as jpegs, bitmaps, etc., to also capture other relevant information that can be associated with a generated link.

In certain embodiments, an application or plug-in running on a link recipient's client device may be configured to scan incoming e-mails or website downloads to detect links that have been shared with the link recipient. In this way, when a link recipient receives a link from a link sharer via e-mail, or downloads a link from a webpage, the application or plug-in may detect the link and forward information regarding the sharing of the link (e.g., the link, the link recipient's name and e-mail address, the date and time the link was shared, etc.) to the file storage server system 20 for link management purposes. In some embodiments, the application or plug-in may be part of the file storage service client application 12 running on the client. In various embodiments, the application or plug-in may require that the link recipient login to the file storage server system 20 so that link recipient information can be automatically associated with the link recipient's various received and downloaded links.

In other embodiments, link management module 38 tracks and organizes links received by the link recipient when the link recipient activates the link. For example, when a link recipient activates a link, link management module 38 may record: (1) the time and date the link was activated; (2) whether a local copy of the files was downloaded; (3) the link recipient's name; (4) which files were viewed using the link, (5) the link sharer's name, (6) the title of the linked file set, or (7) any other information associated with the link or use of the link. As indicated above, some of the recorded information may have been collected when the link was generated and other information may be collected when the link was received and/or selected by the recipient. In embodiments where the link recipient information is captured when the link is selected, the system may require the link recipient to login to the file storage server system 20 so that the system can identify the link recipient based on the link recipient's account information.

Manual Capture of Link Information

In addition to automatically capturing link information, in various embodiments, the link management module 38 may be configured to allow the link recipient to manually save links to a "favorites" menu. For example, when a link recipient receives or downloads a link, they can add the link to a favorites listing to allow them to review information regarding the link at a later date and/or so that they can use the link to easily navigate back to the linked file set.

Moreover, if the link recipient finds a link on a website or social media site when using their mobile device, instead of activating the link on their mobile device and reviewing the linked files, the link recipient can simply add the link to a list of favorite links that is stored both on the user's various client devices and on a central server, and later review the files on their tablet or home computer. In this way, link recipients can store links of interest for later viewing on a more suitable device.

Termination of Rights Associated with a Link

In various embodiments, the link module 38 may be configured to allow a link sharer to terminate an active link to prevent further use by a link recipient. For example, a link sharer can generate multiple different links to the same file set. Thus, the user can more selectively control access to the file set by distributing different links from among the multiple different links to different link-recipients or sets thereof. This may, for example, allow a user to revoke certain link recipients' access to the file set while continuing to permit other link recipients to access the file set (e.g., by deactivating certain users' links to the file set while maintaining other users' links in active status). In some embodiments, link management module 38 may be configured to allow the link sharer to set a time limit on how long the link remains active before terminating viewing rights. In this way, the link sharer may send a link that remains active for two weeks to allow the link recipients to review files contained in a file set. Once the two-week period expires, the link may become deactivated to prevent further access to the linked file set.

Display of Link Information

In various embodiments, the file storage server system 20 may be configured to display a list of links associated with a user. For example, in some embodiments, the file storage server system may display a list of links associated with a user each time that user logs into the file storage server system 20. In other embodiments, a file set sharing link list window may open after the user generates or activates a link. In these embodiments, the list may include one or more of the links that the user generates, receives and/or saves to the system.

In still other embodiments, a list of file sharing links may be displayed in response to a request submitted by a user. For example, an actuatable display element or icon, in the form of a button, may be included as part of the file set viewing window that allows the link recipient to display a list of links associated with the user. This list may be any one or more of links generated, received or saved by the user. The displayed list may include, for example, one or more of: (1) the link sharer's name; (2) the date the link was received; (3) the name of the linked file set; (4) a topic of the linked file set; (5) the date the link was last activated; (6) the actual link itself; or (7) any other information that may be associated with the link or tracked by the link sharer or recipient.

In various embodiments, the user can adjust how links are displayed by clicking display options in the list window, or by setting preferences that are associated with the link recipient's account on the file storage server system. For example, the user may set up their preferences so that only the link sharer's name and the title of the link is displayed, or so that the links are shared in a particular order (e.g., most recently generated or received first). In this way, the user can configure their list of links based on how they wish to view the links.

Exemplary System Operation

Figures 4A, 4B:
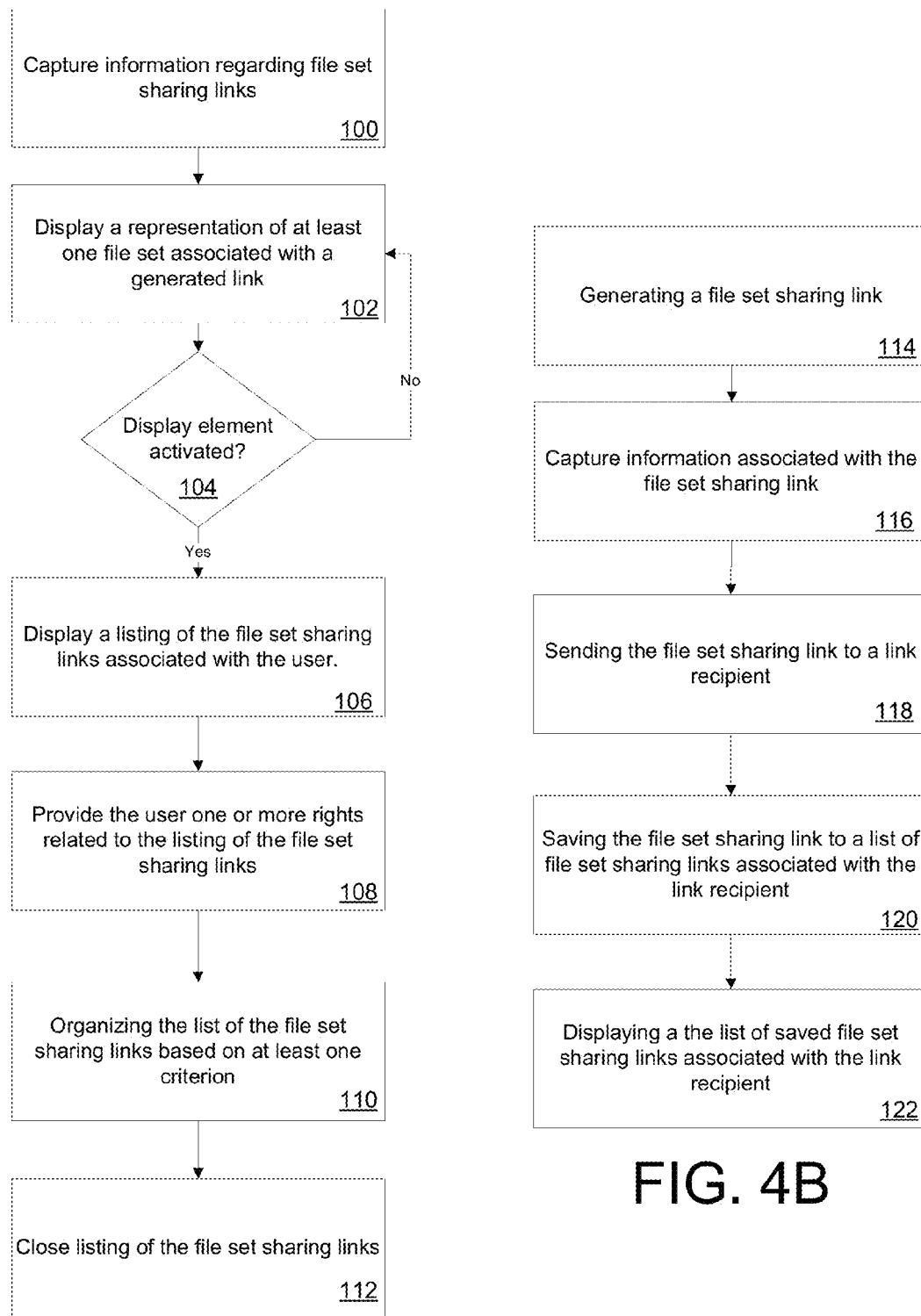
FIG. 4A depicts a flow chart that generally illustrates various steps executed by a file sharing system for organizing and viewing shared file set links in accordance with one embodiment of the present system.
FIG. 4B depicts a flow chart that generally illustrates various steps executed by a file sharing system for organizing and viewing shared file set links in accordance with another embodiment of the present system.
Figure 5:
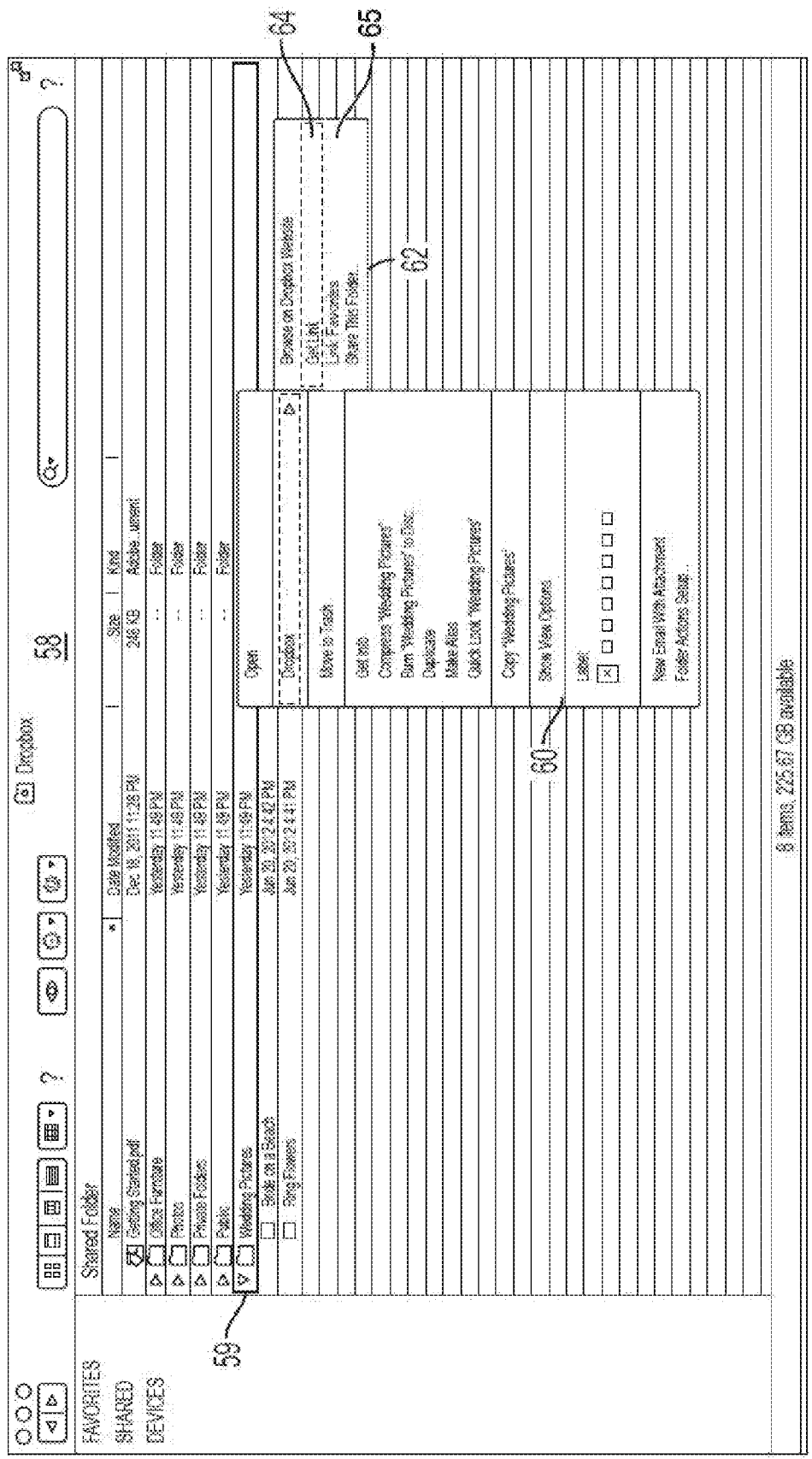
FIG. 5 illustrates one embodiment of a user interface menu for creating a file-sharing link for use in the file management system of FIG. 1.

FIGS. 4A-4B depict exemplary methods for allowing a user to view a list of generated and received file set sharing links, and to save received file set sharing links and associated information to a favorite link list. The system may do this by automatically capturing information associated with a generated file set sharing link, or by manually adding information associated with the link when the user clicks a display element configured to allow the user to save a file set sharing link of interest to the user.

In some embodiments where file set sharing links and associated information are automatically captured, the system provides the user with a display element configured to allow the user to view a listing of sent and received links. In other embodiments, the system is configured to provide the user with at least two display elements—a first for viewing a list of file set sharing links associated with the user, and a second display element for saving a file set sharing link to a list of file set sharing links associated with the user. In some embodiments, the list of file set sharing links contain all links sent and received by the user. In other embodiments, the list only contains file set sharing links that the user saves (e.g., a list of favorite links). In still other embodiments, the list may contain sent links, received links and favorite links.

Operation Associated with the Link Sharer

Referring to FIG. 4A and beginning at step 100, the file storage server system 20 (FIG. 1) captures information regarding file set sharing links generated by link generation module 32 of file sharing module 26, in response to a link generation request from a link sharer user. In some embodiments, the system may automatically capture information associated with a generated file set sharing link when the link is created and then store the information in data store 28 (FIG. 1). At step 102, the file storage server system 20 displays a representation of at least one file set associated with a generated link along with a first and second display element (e.g., a selectable button or link) in a browser window or in a local client application window. At step 104, the system determines if the link sharer activates the first display element. If not, then the system continues to display the representation of the file set. If, on the other hand, the system detects that the link sharer activates the first display element at step 104, then at step 106, file storage server system 20 displays a list of various (e.g., all) file set sharing links associated with the link sharer. As previously indicated, the list may contain links generated and received by the link sharer.

At step 108, the file storage server system provides the link sharer with the ability to modify (e.g., one or more of adding, deleting and editing rights) the list of generated and received file set sharing links. For example, at step 110, the link sharer may organize the list based on a predetermined criterion. For example, the predetermined criterion may be one or more of (1) the name of the person who sent the link (for received links), (2) the link creation date, (3) the date the link was last activated, (4) the name of the linked file set, or (5) any other suitable criteria for organizing the list. At step 112, when the user closes the list of links, the user can once again view the representation of the file set. In still other embodiments, the one or more rights may also comprise rights to deactivate a previously shared link or to delete a link from the link list.

Operation Associated with the Link Recipient

In another embodiment of a method for managing file set sharing links and referring to FIG. 4B, beginning at step 114, the file storage server system 20 is configured to generate a file set sharing link in response to a request submitted by a link sharer using a client device (e.g., a computer or handheld device). At step 116, the file storage server system 20 captures information associated with the generated file set sharing link. At step 118, the link sharer sends the file set sharing link to a link recipient. At step 120, in response to a request to save the file set sharing link by the link recipient, the system saves the file set sharing link and associated information to a list of file set sharing links associated with the link recipient. At step 122, if the link recipient submits a request to display the list of saved file set sharing links, the file storage server system displays the list of saved file set sharing links.

It should be understood that the various steps described herein may vary in the context of different embodiments, and that certain steps may be omitted and other steps may be added. Moreover, other embodiments can be made by combining various portions of other embodiments.

Example User Experience

The following exemplary user experience is described in reference to a synchronized file sharing system provided by Dropbox, Inc. of San Francisco, Calif. (hereinafter Dropbox). However, it should be understood after review of this disclosure by those of skill in the art that the functionality described herein may be used with other document management systems, such as the NETDOCUMENTS system, which is offered by Netdocuments, Limited of Orem, Utah. FIGS. 5-10 are computer screen shots that may be used to understand the experience of a link sharer and link recipient as they use a system according to an embodiment of the present system and method.

Link Sharer Experience

A link sharer may generate a link via link generation module 32 (FIG. 3) in different manners depending on the configuration of file server storage system (FIG. 1). In one embodiment and referring to FIG. 5, the link sharer may generate a link using file storage service client application 12 provided on the client device 10. That is, when a user right clicks on a file set or folder 59, menu 60 opens allowing the user to select a DROPBOX option, thereby opening a second, context-sensitive menu 62. Second menu 62 may contain one or more options such as "Get Link" 64 and "Link Favorites" 65. In various embodiments, Link Favorites menu item 65, when selected, opens a window containing a list of saved links, a list of sent links, a list of received links and/or a list having some combination of sent, received and saved links. From second menu 62, the link sharer selects a Get Link menu item 64.

Figure 6A:
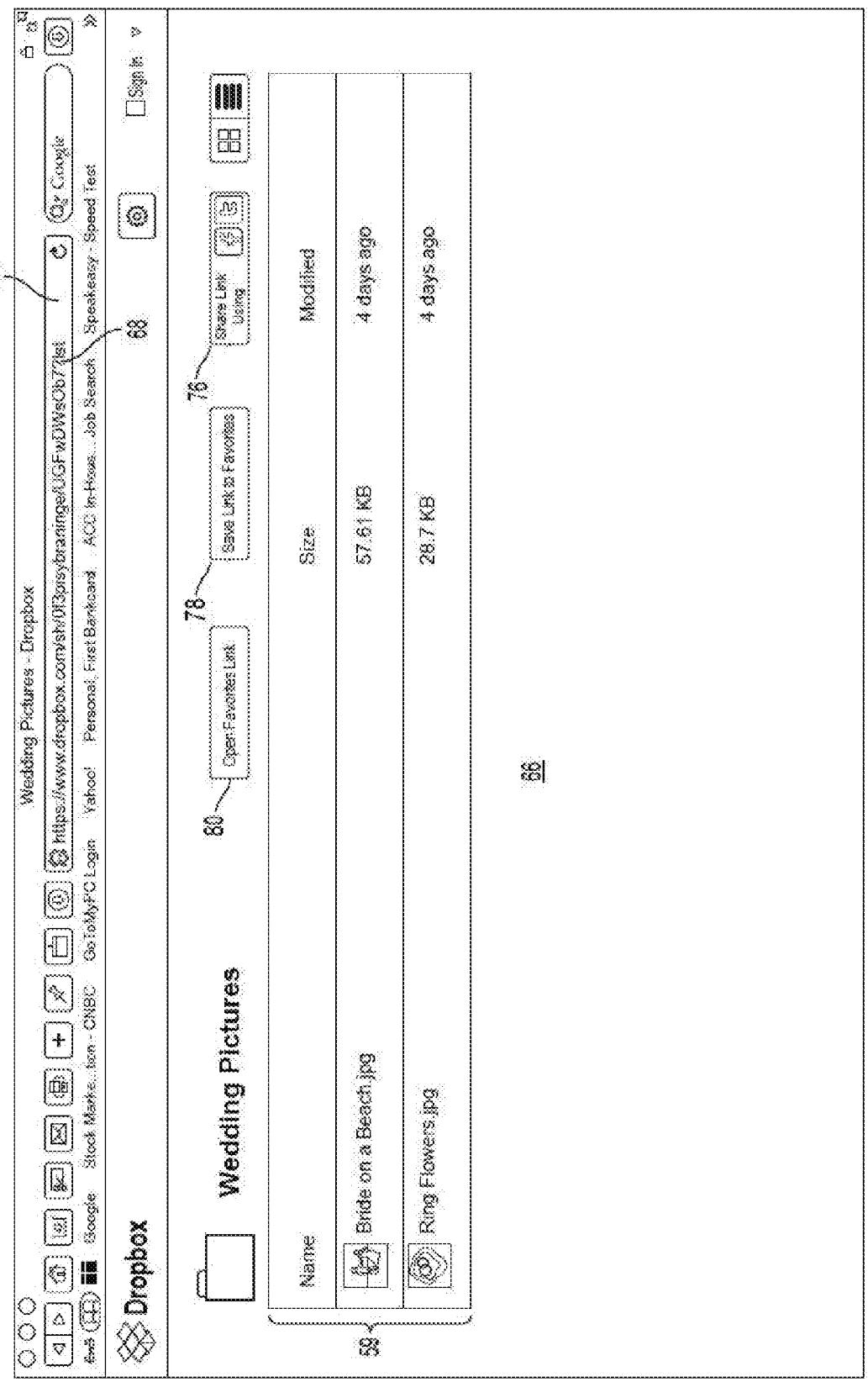
FIG. 6A illustrates a browser window showing the generated link for a shared file set in accordance with one embodiment of the present system.
Figure 6B:
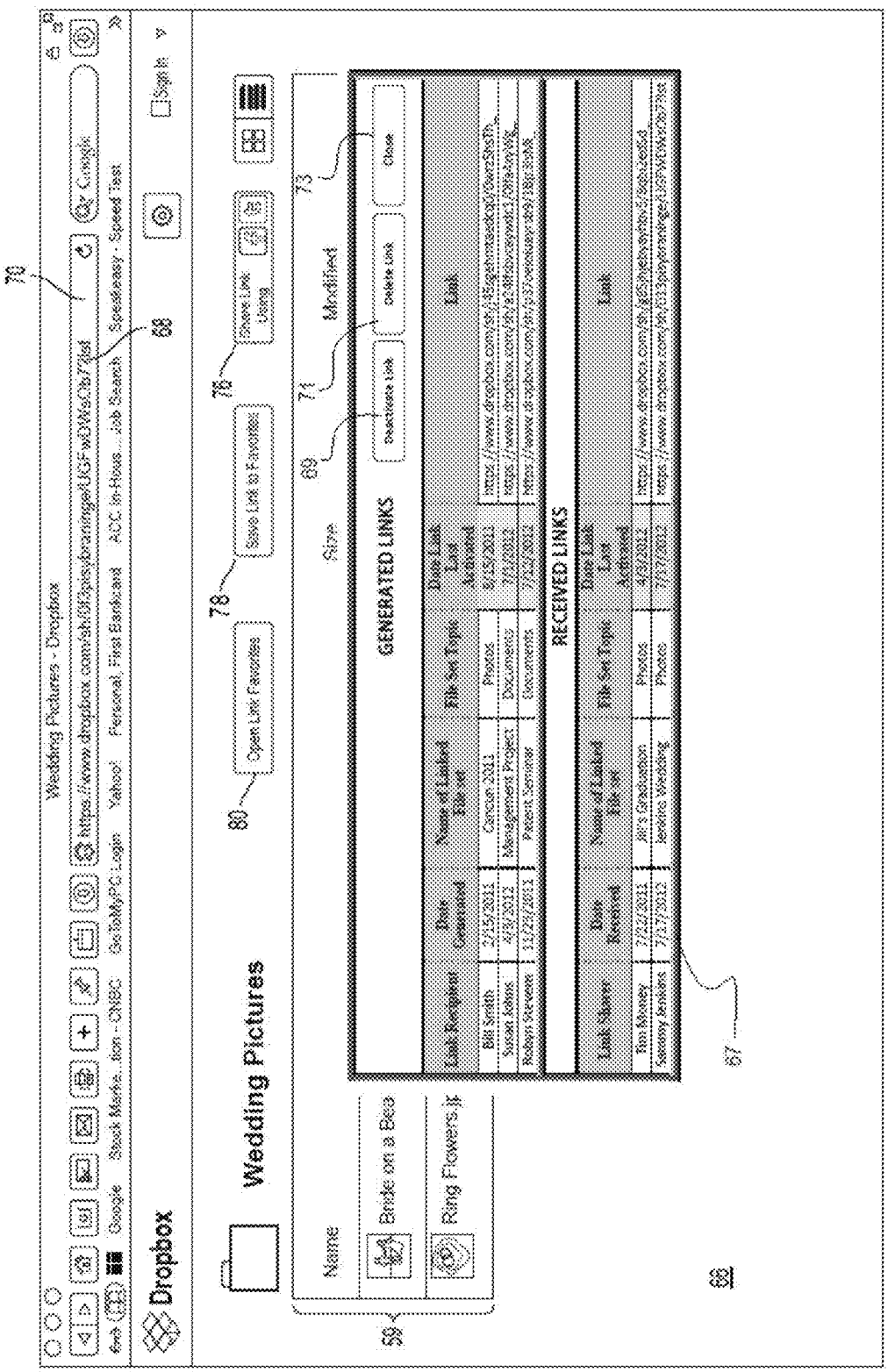
FIG. 6B illustrates a browser window that presents a list of file set sharing links associated with a user in accordance with one embodiment of the present system.

Referring to FIG. 6A, once the "get link" menu item 64 (FIG. 5) is selected, a browser window 66 opens displaying the file set of selected folder 59 in a file listing area (not numbered). Generated link 68, for shared file set of folder 59, is displayed in browser address bar 70. In some embodiments, the link sharer may send the link via a local e-mail client on client device 10, or through a server side e-mail client that is part of file storage server system 20. In other embodiments, a link sharing option area 76 is displayed that allows the user to share the link using a social media application, for example, FACEBOOK or TWITTER. Selection from link sharing option area 76 prompts the link sharer for their login information for the selected service. Assuming that correct login information is provided, link distribution module 36 uses an application-programming interface ("API") of the selected service to disseminate the link via the service, such as by adding it as a post to the link sharer's page on a social networking service (e.g. Facebook), or by sending it as part of a textual message on a micro blogging service (e.g. Twitter). It should be understood that the generated link 68 could also be shared by copying the link from within the browser address bar 70 and pasting it in a webpage or through any other suitable sharing technique.

Browser window 66 may also contain a display element in the form of an "Open Favorites Link" button 80 (See FIGS. 6A and 6B) that is configured to open a window containing links that are associated with the link sharer. For example, referring to FIG. 6B, when the link sharer clicks on "open favorites link" button 80, a window 67 opens displaying a list of all generated and received file sharing links that are associated with the user. The link sharer may organize the list by any column, and in the example shown in the figure, the list is organized by the date the link was last activated. In various embodiments, the window may contain function buttons such as a deactivate link button 69, delete link button 71 and a close button 73. In some embodiments, when the link sharer selects one or more links, the link sharer can deactivate that link by clicking the deactivate link button 69 to prevent the link from being used by corresponding link recipients. In some embodiments, when the deactivate button 69 is selected, a second window (not shown) may open allowing the link sharer to deactivate the link for selected link recipients from a group of link recipients that received the link. The delete link button 71 allows the link sharer to remove one or more generated or received links from the link list. Finally, the close button 73, when activated by the link sharer, closes the list window so the link sharer can return to the file set representation displayed in the window 66.

Link Recipient Experience

Figure 7:
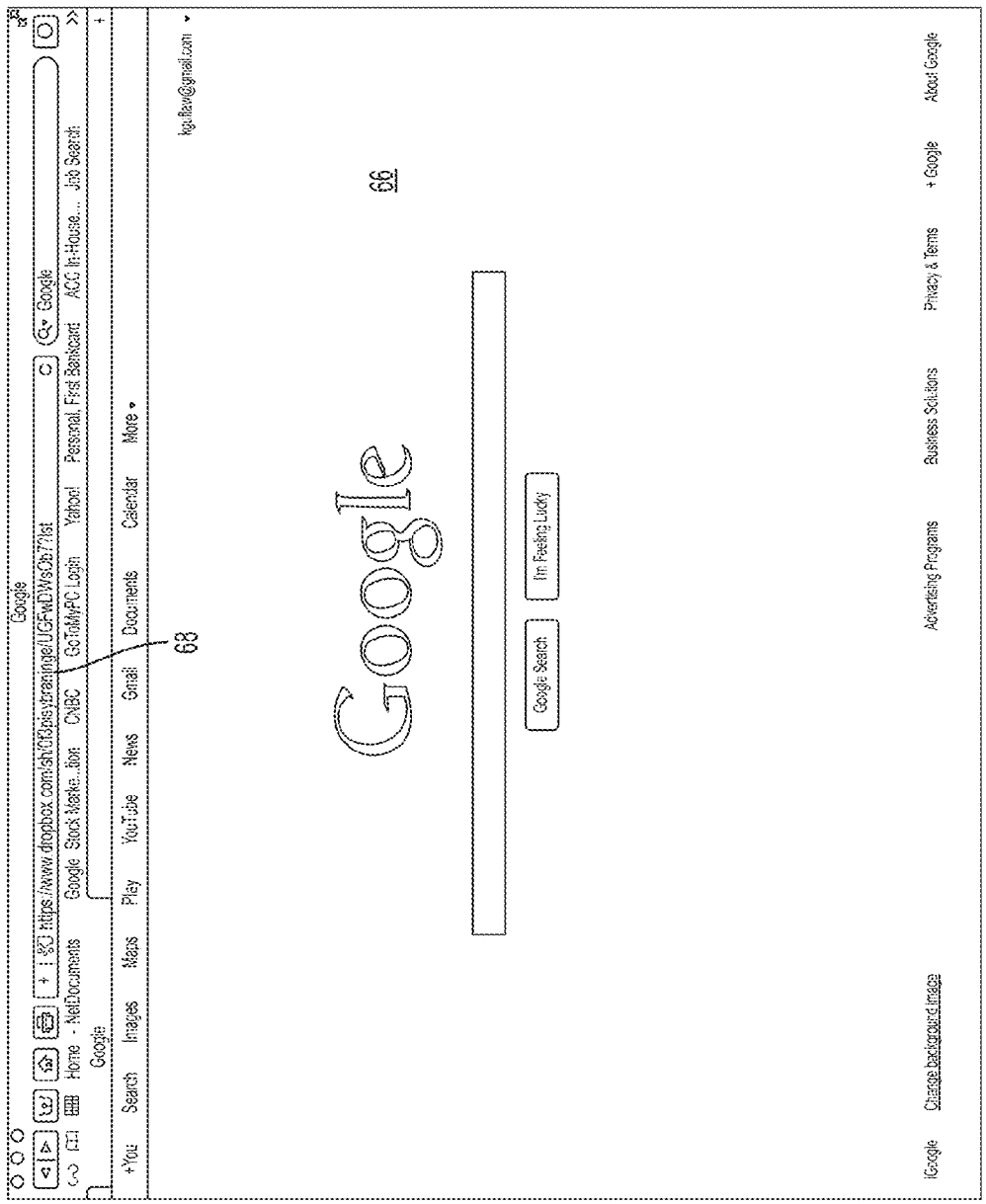
FIG. 7 illustrates one embodiment of a browser window that can be used to activate a shared file link in accordance with one embodiment of the present system.

Once the link recipient receives the link, the link recipient may, for example, select (e.g., click on) the link if it is an active link or, referring to FIG. 7, the link recipient may copy the link 68 and paste it into their browser's address bar. Upon entering the link 68 in the browser's address bar, referring to FIG. 8, the file access module 34 (FIG. 3) provides the shared file set and/or visual representations thereof to the client 10 in response to the link recipient having entered the received link. That is, client 10 sends a corresponding request to the link-based sharing module 26 (FIG. 3). File access module 34 handles the request by locating the entry in the data store 28 (FIG. 1) using the parameters contained within the link, and extracts the associated file set identifier. File access module 34 then displays a representation of the file set that corresponds to the file set identifier by displaying the file set folder 59 in browser window 66.

Figure 8:
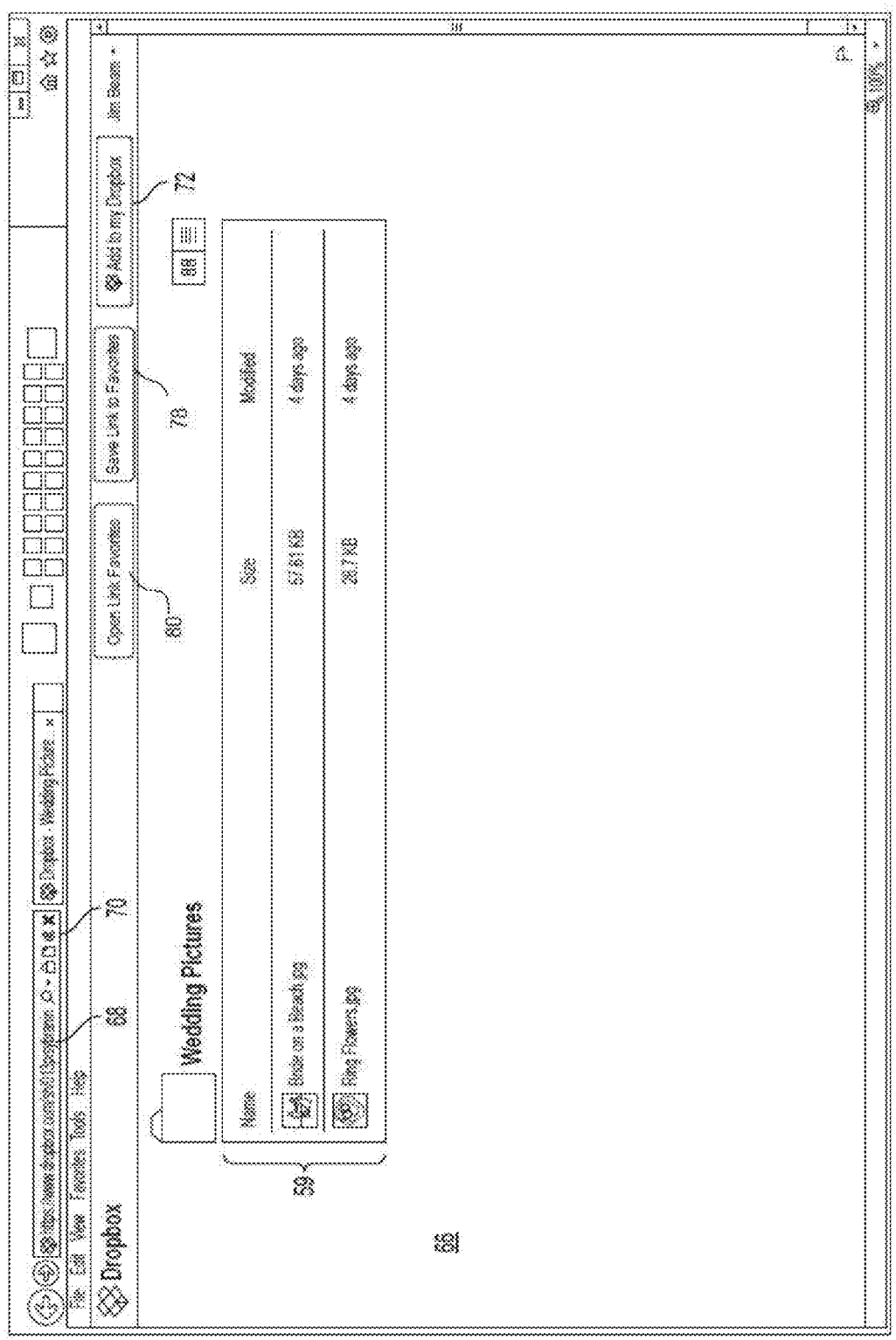
FIG. 8 illustrates a browser window that presents shared files associated with a shared file set link in accordance with one embodiment of the present system.

Still referring to FIG. 8, browser window 66 may include a "save link to favorites" display element 78 that allows the link recipient to manually save the file set sharing link (and associated information) to a list of favorite links. In addition to the display element 78, browser window 66 may also include an "open link favorites" display element 80 that allows the user to view a list of generated and received file set sharing links that may also include the saved links. In some embodiments, when a link is activated the file storage server system may automatically capture link recipient information and store the information in data store 40. In this way, the link information the file storage server system 20 may update the information associated with the link to include information about the link recipient.

In various embodiments, if the link recipient activated the link when it was received, the link recipient may view the linked file set, and/or download the linked file set to the file directory in their account using an add to my DROPBOX display element 72, but the link recipient cannot make changes to file set 59 in the link sharer's account. Said another way, while the link recipient can view and associate a copy of file set 59 to their DROPBOX account or locally to their client device 10 and make changes to the local copy, they cannot collaborate with the link sharer by adding, deleting or editing the files in the link sharer's account.

Figure 9:
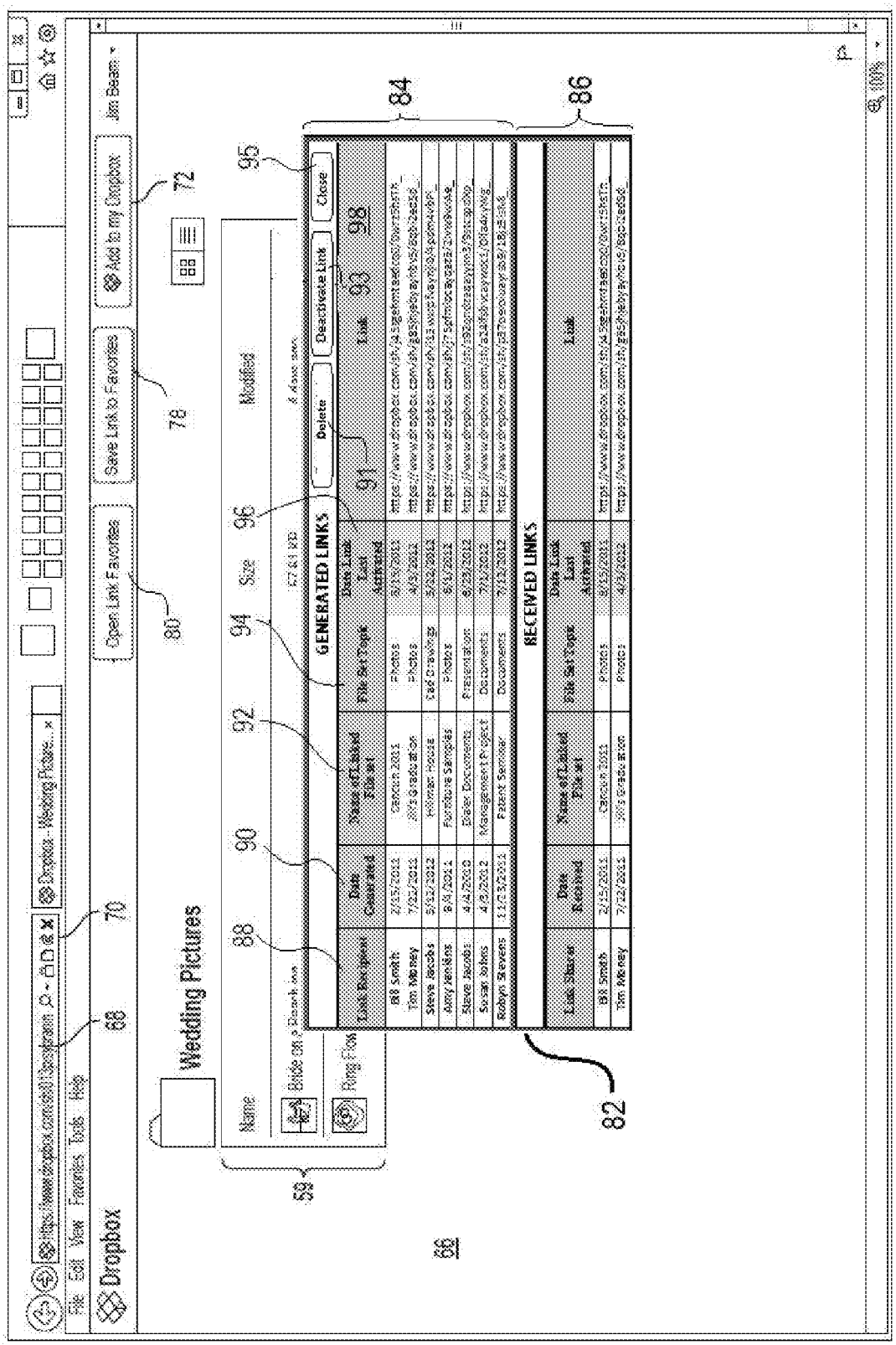
FIG. 9 illustrates a window displaying links associated with a user for managing the links in accordance with an embodiment of the present invention.

Referring to FIG. 9, when the link recipient clicks "open link favorites" display element 80, a window 82 opens displaying links associated with the link recipient. In one embodiment, list 82 may contain a first group 84 of generated file set sharing links and a second group 86 of received file set sharing links that are associated with the link recipient. In various embodiments, the list contains information associated with the link such as: (1) the name of the recipient of the link column 88; (2) the date the link was generated column 90; (3) the name of the linked file set column 92; (4) a file set topic column 94; a date the link was last activated column 96; and a link column 98. It should be understood from this disclosure that the file storage server system may be configured to capture other information associated with the link.

In some embodiments, the system provides the user with certain options associated with the listed links. For example, the user may be able to delete one or more file set sharing links, deactivate one or more of the generated file set sharing links, select one of the file set sharing links to view, add a file set sharing link to the list, or organize the list of file set sharing links based on a predetermined criterion. For example, the list may be organized by any column, and in the example shown in the figure, the list is organized by the date the link was last activated.

In other embodiments, the window may contain function buttons such as a delete link button 91, a deactivate link button 93 and a close button 95. In various embodiments, the delete link button 91 allows the link recipient to remove one or more selected links from the list. Thus, the link recipient can remove a link that is no longer of interest. In some embodiments, when the link sharer selects a link in the list 84, the link sharer can deactivate that link by clicking the deactivate link button 93, which will prevent the link from being used by link recipients. In some embodiments, when the deactivate button 93 is selected, a second window (not shown) may open allowing the link sharer to deactivate the link for one or more link recipients chosen from a group of link recipients that received the link. Finally, the close button 95 allows the link recipient to close the list window 82 so the link recipient can return to the file set representation displayed in the window 66.

Figure 10:
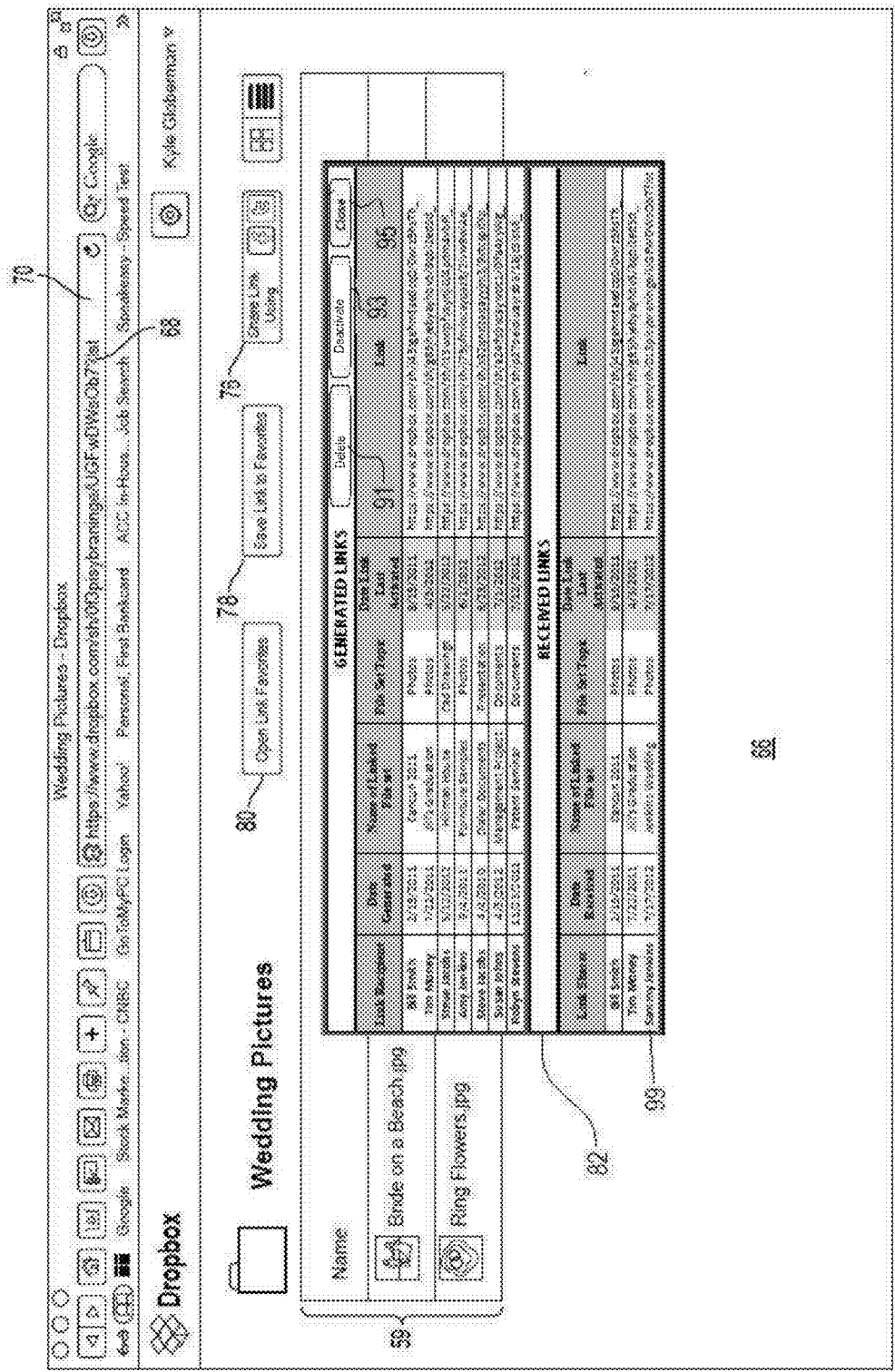
FIG. 10 illustrates a window displaying links associated with a user for managing the links in accordance with an embodiment of the present invention.

Referring to FIG. 10, in various embodiments where a link is not automatically saved to a list of links, the link recipient can save the file set sharing link to a received links list by clicking on "save link to favorites" display element 78. In some embodiments, upon activation of display element 78, a generated and received file set sharing link list 82 opens thereby displaying the list of saved file set sharing links, which may include the newly added file set sharing link 99. By configuring the system to open link list 82 when a link is saved, the user can easily check the information saved to the list to ensure that the saved information is both accurate and complete.

Figure 11:
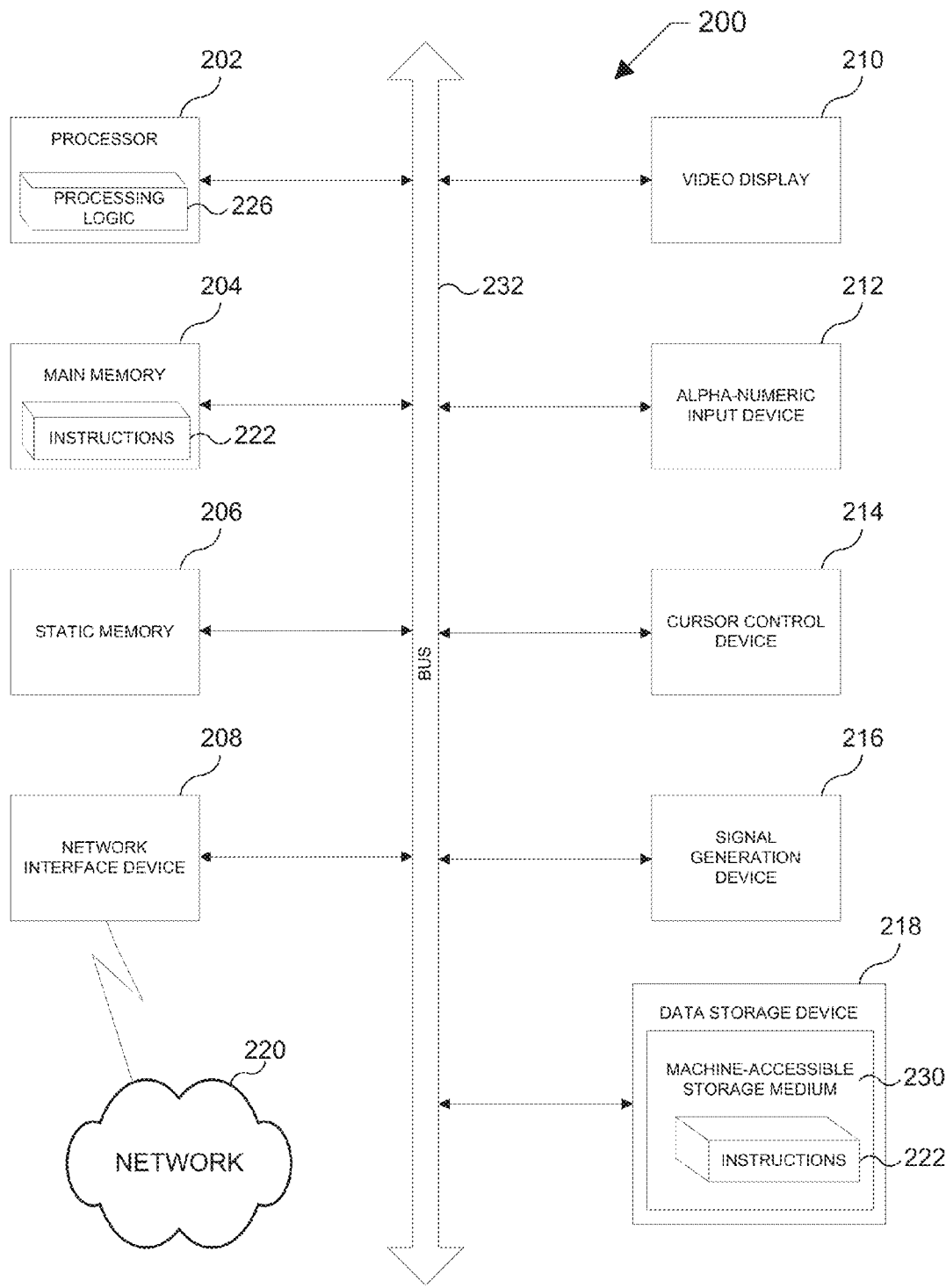
FIG. 11 is a block diagram of a computer that may be used, for example, as a client or server computer within the context of the file management system of FIG. 1.

FIG. 11 illustrates a diagrammatic representation of computer architecture 200 that can be used within the file management system 5, for example, as a client computer (e.g., one of the client computers 10 shown in FIG. 1), or as a server computer (e.g., the File Storage Server System 20 shown in FIG. 1). In particular embodiments, the computer 200 may be suitable for use as a computer of a link sharer or as a computer of a link recipient as these computers operate as clients within the context of the file storage server system 20 to facilitate the sharing of folder between a link sharer and a link recipient as discussed above.

In particular embodiments, the computer 200 may be connected (e.g., networked) to other computers in a LAN, an intranet, an extranet, and/or the Internet. The computer 200 may operate in the capacity of a server or a client computer in a client-server network environment, or as a peer computer in a peer-to-peer (or distributed) network environment. The computer 200 may be a personal computer (PC), a tablet PC, a set-top box (STB), a Personal Digital Assistant (PDA), a cellular telephone, a web appliance, a server, a network router, a switch or bridge, or any computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

The exemplary computer 200 includes a processing device 202, a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a data storage device 218, which communicate with each other via a bus 232.

The processing device 202 represents one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute the processing logic 226 for performing various operations and steps discussed herein.

The computer 200 may further include a network interface device 208. The computer 200 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

The data storage device 218 may include a non-transitory computer-accessible storage medium 230 (also known as a non-transitory computer-readable storage medium or a non-transitory computer-readable medium) on which is stored one or more sets of instructions (e.g., software 222) embodying any one or more of the methodologies or functions described herein. The software 222 may also reside, completely or at least partially, within the main memory 204 and/or within the processing device 202 during execution thereof by the computer 200, the main memory 204 and the processing device 202 also constituting computer-accessible storage media. The software 222 may further be transmitted or received over a network 220 via the network interface device 208.

While the computer-accessible storage medium 230 is shown in an exemplary embodiment to be a single medium, the term "computer-accessible storage medium" should be understood to include a single medium or multiple media (e.g., a centralized or distributed database, and/or associated caches and servers) that store the one or more sets of instructions. The term "computer-accessible storage medium" shall also be understood to include any medium that is capable of storing, encoding or carrying a set of instructions for execution by the computer and that cause the computer to perform any one or more of the methodologies of the present invention. The term "computer-accessible storage medium" shall accordingly be understood to include, but not be limited to, solid-state memories, optical and magnetic media, etc.

CONCLUSION

Many modifications and other embodiments of the invention will come to mind to one skilled in the art to which this invention pertains having the benefit of the teachings presented in the foregoing descriptions and the associated drawings. It should also be understood that, although various embodiments are described above as using a link (e.g., a URL) to provide user access to a shared file set, any other suitable indicia may be used for this purpose such as a link that includes a file path to the file set. Moreover, in some embodiments, generated and received links may automatically be saved to a "favorite links" listing. In other embodiments, only certain links may be included in the listing based on global user preferences. In still other embodiments, a user may set a preference that requires that the user to add a link to their favorites listing thereby only providing a list of those links that the user chooses to save.

In light of the above, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A synchronized content management system comprising:

one or more processors; and memory having stored therein instructions which, when executed by said one or more processors, cause the synchronized content management system to:

store information regarding a plurality of file sharing links associated with the synchronized content management system, wherein the plurality of file sharing links provide access to files that are stored in the synchronized content management system; and selectively display a listing of said plurality of file sharing links, wherein the listing displays:

in association with a first link, from the plurality of file sharing links, shared with a first link recipient from a first link sharer:

a first location of a first respective file referenced by the first link, the first location being at the synchronized content management system;
a first identification of the first link sharer who shared the first link with the first link recipient;
a second identification of the first link recipient; and
in association with a second link, from the plurality of file sharing links, shared by a second link sharer with the first link sharer:
a second location of a second respective file referenced by the second link, the second location being at the synchronization content management system;
a third identification of the second link sharer who shared the second link with the first link sharer; and
the first identification of the first link sharer.

2. The computer system of claim 1, wherein the listing further presents in association with each of the first link and the second link a respective date in which a respective one of the first link and the second link was last activated.

3. The computer system of claim 1, wherein the system is adapted to automatically store information regarding at least one of the plurality of shared links at least partially in response to a user sending or receiving the at least one of the plurality of shared links.

4. The computer system of claim 1, wherein the listing further displays a first date when the first link was generated and a second date when the second link was received.

5. The computer system of claim 1, wherein the system is adapted to automatically store information regarding the first link from the plurality of file sharing links at least partially in response to the first link sharer sending the first link.

6. The computer system of claim 5, wherein the plurality of file sharing links comprises a set of one or more file sharing links that have been saved as favorites associated with a user account at the synchronized content management system.

7. The computer system of claim 1, wherein the system is adapted to provide a user account with one or more rights associated with the displayed list of file set sharing links, said one or more rights selected from a group consisting of:
deactivating one of the plurality of file set sharing links;
deleting a file set sharing link from the plurality of file set sharing links; and
organizing the listing of the plurality of file set sharing links based on a predetermined criterion.

8. A computer-implemented method comprising:
generating a plurality of file set sharing links that are configured to allow a link sharer account to provide a link recipient account with viewing access to a linked file set when a respective link is activated, where files of the linked file set are stored in a synchronized content management system;
capturing information regarding said plurality of generated file set sharing links;
at least partially in response to a request from a user, displaying a list of file set sharing links associated with the user, said list comprising said plurality of generated file set sharing links and at least one received link that a link sharer shared with the user, wherein the list identifies a link recipient and a link sharer and:
in association with at least one first link shared with a first link recipient from a first link sharer:
a first location of a first respective file referenced by the first link;
a first identification of the first link sharer who shared the first link with the first link recipient;
a second identification of the first link recipient; and
in association with a second link shared by a second link sharer with the first link sharer:
a second location of a second respective file referenced by the second link;
a third identification of the second link sharer who shared the second link with the first link sharer; and
the first identification of the first link sharer.

9. The computer-implemented method of claim 8, further comprising the step of providing one or more rights associated with the displayed list of file set sharing links, said one or more rights selected from a group consisting of:
deactivating one of the plurality of file set sharing links;
deleting a file set sharing link from the plurality of file set sharing links; and
organizing the listing of the plurality of file set sharing links based on a predetermined criterion.

10. The computer-implemented method of claim 8, wherein the capturing of information regarding the plurality of file set sharing links is performed automatically as the plurality of file set sharing links are generated.

11. The computer-implemented method of claim 8, wherein the step of displaying the listing of the plurality of file set sharing links is carried out within the context of a synched file sharing system.

12. The computer-implemented method of claim 8, further comprising the step of providing a user account the ability to organize the listing based on a predetermined criteria.

13. The computer-implemented method of claim 8, wherein one or more steps of the method are executed by one or more computer servers comprising at least one processor and memory.

14. The computer-implemented method of claim 8, further comprising the step of generating a file set sharing link at least partially in response to receiving a request to generate a file set sharing link.

15. A computer-implemented method comprising:
at least partially in response to receiving a request to share a file set, generating a file set sharing link, wherein said file set sharing link is configured to provide a first link recipient with at least access to a linked file set, where files of the linked file set are stored in a file sharing system;
capturing information associated with said generated file set sharing link;
capturing information associated with said first link recipient;
associating said first link recipient information with said captured information associated with said file set sharing link; and
at least partially in response to a request to view said information associated with said generated file set sharing link, displaying a list of file set sharing links, wherein the list comprises:
in association with a first link shared with the first link recipient from a first link sharer:
a first location of a first respective file referenced by the first link;
a first identification of the first link sharer who shared the first link with the first link recipient;
a second identification of the first link recipient; and
in association with a second link shared by the first link recipient with a second link recipient:

a second location of a second respective file referenced by the second link;

the second identification of the first link recipient who shared the second link with the second link recipient; and a third identification of the second link recipient.

16. The computer-implemented method of claim 15, wherein the step of capturing information associated with said generated file set sharing link is performed automatically at the time said link is generated.

17. The computer-implemented method of claim 15, wherein the step of capturing information associated with said first link recipient is performed when said first link recipient manually submits a request to save said first link.

18. The computer-implemented method of claim 15, wherein said list further comprises all file set sharing links associated with said first link recipient, the request being received from a user account associated with the first link recipient.

19. The computer-implemented method of claim 15, further comprising providing a user account with one or more rights associated with the displayed list of file set sharing links, said one or more rights selected from a group consisting of:

deactivating one of the plurality of file set sharing links;

deleting a file set sharing link from the plurality of file set sharing links; and organizing the listing of the plurality of file set sharing links based on a predetermined criterion.

* * * * *